United States Patent Office 3,523,985
Patented Aug. 11, 1970

3,523,985
POLYSULFIDES AND PROCESS
FOR PRODUCING SAME
Oren L. Marrs, Bartlesville, Okla., assignor to Phillips
Petroleum Company, a corporation of Delaware
No Drawing. Filed Feb. 16, 1968, Ser. No. 705,941
Int. Cl. C08d 9/08; C08f 29/12
U.S. Cl. 260—887   17 Claims

ABSTRACT OF THE DISCLOSURE

A mercaptoalkylcycloalkanethiol, a polythiol having at least three mercapto groups, and an unsubstituted or substituted alkanedithiol are oxidatively coupled with an oxidizing agent such as dimethyl sulfoxide, a peroxide, or oxygen to form polymers containing disulfide linkages. The resulting polymers can be rapidly cured with conventional curing agents to formulate sealants, coatings and the like which have good low temperature flexibility. In addition, the resulting disulfide polymer can be blended with a mercapto-terminated polymer of a 1,3-alkadiene and the resulting blend cured to produce sealants, coatings and the like having low temperature flexibility.

BACKGROUND OF THE INVENTION

Polysulfide polymers and polymers with disulfide linkages are widely employed as sealants, coating materials, and the like. Disulfide polymers previously prepared from mercaptoalkylcycloalkanethiols and a trithiol by coupling with dimethyl sulfoxide and the like have suffered the disadvantage of curing relatively slowly and having relative inflexibility at low temperatures. Such disadvantages are of particular concern during cold weather application and use where the coatings and sealants employed should cure rapidly and retain considerable flexibility at low temperatures.

THE INVENTION

In accordance with the present invention there are provided novel compositions having low temperature flexibility which are formed by the process wherein a mercaptoalkylcycloalkanethiol, a polythiol having at least three mercapto groups, and an unsubstituted or substituted alkanedithiol are oxidatively coupled with an oxidizing agent such as dimethyl sulfoxide, a peroxide, or oxygen to form polymers with disulfide linkages. Such disulfide polymers can be rapidly cured with conventional curing agents such as PbO$_2$, ZnO, and the like, to formulate sealants, coatings, and the like, the good low temperature flexibility.

The process of my invention, then, mitigates the problems of the art by providing materials that cure rapidly and retain good flexibility at low temperatures.

It is thus an object of the present invention to provide novel polymers having low temperature flexibility.

Another object of this invention is to provide a process for the formation of novel polymer compositions having low temperature flexibility.

Other aspects, objects and the several advantages will become apparent from a consideration of the disclosure and the appended claims.

The mercaptoalkylcycloalkanethiols that can be employed in this invention are those of the formula

HS—Y—Z—SH where Y is a cycloalkylene radical containing 5 to 8 carbon atoms and Z is an alkylene radical containing 1 to 5 carbon atoms. Examples of such mercaptoalkylcycloalkanethiols are: 3-(2-mercaptoethyl)cyclohexanethiol, 4-(2-mercaptoethyl)cyclohexanethiol, 4-(5-mercaptopentyl)cyclooctanethiol, 3-(mercaptomethyl)cyclopentanethiol, 4-(3-mercaptopropyl)cyclohexanethiol, 2-(3-mercaptobutyl)cycloheptanethiol and the like and mixtures thereof.

The unsubstituted or substituted alkanedithiols that can be employed in this invention are those of the formula HS—R'—(XR")$_n$—SH where R' is an unsubstituted or cycloalkyl- or aryl-substituted alkylene radical containing 1 to about 36 carbon atoms and R" is an unsubstituted or cycloalkyl- or aryl-substituted alkylene radical containing 1 to about 10 carbon atoms, and where $n$ is an integer from 0 to 4 and X is

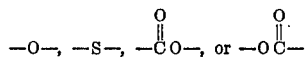

Examples of such compounds are methanedithiol,
1,2-ethanedithiol,
1,2-propanedithiol,
1,4-butanedithiol,
2-methyl-1,4-hexanedithiol,
1,10-decanedithiol,
3-cyclopentyl-2,5-dodecanedithiol,
2-phenyl-1,6-hexadecanedithiol,
4-ethyl-1,20-eicosanedithiol,
1,36-hexatriacontanedithiol,
bis(mercaptomethyl) ether,
bis(2-mercaptoethyl) ether,
bis(3-mercaptopropyl) ether,
2,2-dimethyl-1,3-bis(mercaptomethoxy)propane,
bis(3-mercaptopropoxy)methane,
1,2-bis(mercaptomethoxy)ethane,
1,2-bis[2-(mercaptomethoxy)ethoxy]ethane,
2,3-dimethyl-1,4-bis[2-(2-mercaptoethoxy)ethoxy]butane,
10-{10-{10-[10-(36-mercaptohexatriacontyloxy)
  decyloxy]decycloxy}decyloxy}decanethiol,
bis(2-phenyl-3-mercaptopropyl) ether,
bis(2-mercaptoethyl) sulfide,
bis(3-mercaptopropyl) sulfide,
1,2-bis(3-mercaptobutylthio)ethane,
bis[2-(2-mercaptoethylthio)ethyl] ether,
bis(1-cyclopentyl-2-mercaptoethyl) sulfide,
4-mercaptobutyl 3-mercaptopropionate, bis(mercaptoacetate) of ethylene glycol, and bis(3-mercaptopropionate) of triethylene glycol. In addition, mixtures of such unsubstituted and substituted alkanedithiols can be used.

The polythiols having at least three mercapto groups that are useful in accordance with this invention are those of the formula R(SH)$_m$ where R is a hydrocarbon radical selected from the group consisting of saturated aliphatic, saturated cycloaliphatic, and aromatic radicals, and combinations thereof, such as aryl-substituted aliphatic radicals, alkyl-substituted aromatic radicals, and the like, said hydrocarbon radical having from 3 to about 20 carbon atoms and having a valence equal to $m$, and $m$ is an integer of at least three to provide cross linkage sites. While $m$ will generally be in the range of 3 to 6, it is presently preferred that $m$ be 3 or 4 because of the greater availability of the compounds.

Examples of polythiols having at least three mercapto groups which are suitable for use in accordance with the invention include 1,2,3-propanetrithiol, 1,2,4-butanetrithiol, 1,2,3,4-butanetetrathiol, 1,2,3-pentanetrithiol, 3-methyl-1,2,3-heptanetrithiol, 1,2,10-decanetrithiol, 1,2,3,5,6-dodecanepentathiol, 1,2,4,5,7,8-hexadecanehexathiol, 2,3,5,8-eicosanetetrathiol, 1,2,3-cyclopentanetrithiol, 1,2,3,4-cyclohexanetetrathiol, 2-ethyl-1,2,3,4-cyclooctanetetrathiol, 2-(mercaptomethyl)-1,3-cyclopentanedithiol, 2-cyclohexyl-1,3,4-butanetrithiol, 1,2,3-benzenetrithiol, 1,2,4,5-benzenetetrathiol, toluene-2,3,4-trithiol, toluene-α,2,3,4-tetrathiol, 2-phenyl-1,3,6-hexanetrithiol, 1,5,10-decanetrithiol, 1,3,5-cyclohexanetrithiol, 3-(2-mercaptoethyl)-1,2-cyclohexanedithiol, 1,3,4-pentanetrithiol, 1- mercaptomethyl - 3 - (2,3-dimercaptopropyl)benzene and 1,2,5-cyclooctanetrithiol, and mixtures thereof.

The polythiol having at least three mercapto groups can be employed in quantities between about 0.1 and about 10 mole percent of the mercaptoalkylcycloalkanethiol, preferably between 0.5 and 5 mole percent. The unsubstituted or substituted alkanedithiol is employed in quantities between about 5 and about 900 mole percent of the mercaptoalkylcycloalkanethiol, preferably between 10 and 100 mole percent.

The above thiols can be oxidatively coupled to form disulfide polymers, by employment of an oxidative coupling agent such as dimethyl sulfoxide, oxygen, a peroxide such as hydrogen peroxide, sodium peroxide, calcium peroxide, and the like, or any other oxidative coupling agent known to effect oxidation of two thiol moieties to a disulfide moiety. The amount of such oxidative coupling agent to be employed for optimum results is, of course, dependent on variables such as the particular thiols employed, the coupling agent employed, the degree of coupling desired, and other factors. However, in general, about 0.5 to 0.8 equivalent of oxidizing agent per equivalent of thiol moieties should be employed, though in the case of dimethyl sulfoxide, an excess can, and usually should, be employed. The optimum amount of each particular oxidizing agent for the particular result desired can readily be determined for each particular set of circumstances by one skilled in the art.

The coupling reaction can be conveniently carried out at atmospheric pressure and at temperatures between 5° C. and 300° C., preferably between 30° C. and 200° C. Here again, the temperature to be employed can readily be determined by one skilled in the art for the optimum effect desired. In like manner, the oxidative coupling reaction can be effected for such time as to effect the degree of coupling desired. Optimum times can readily be determined by one skilled in the art for each situation, but reaction times between 0.1 and 24 hours are normally most suitable.

After oxidative coupling is effected, the polymers of this invention can be cured in a conventional manner with conventional curing agents. For instance, lead dioxide, zinc oxide, cumene hydroperoxide, dinitrobenzene, p-quinone dioxime, or the like, can be employed in amounts sufficient to effect the degree of cure desired. Also, curing aids such as cobalt linoresinate can be employed if desired, but are not necessary.

The following examples will further illustrate the invention; but the invention is not intended to be limited thereto.

Example I

To a stirred reactor were charged 1.5 moles (264 g.) of a mixture of 3-(2-mercaptoethyl)cyclohexanethiol and 4-(2-mercaptoethyl)cyclohexanethiol, 0.5 mole (69 g.) of bis(2-mercaptoethyl) ether, 650 ml. of dimethyl sulfoxide, and 0.03 mole (4.2 g.) of 1,2,3-propanetrithiol. Heat was applied, the temperature raised to 160° C. under reflux to precipitate the polymer in about 1.5 hours, and the reactor was allowed to cool for about 16 hours. The dimethyl sulfoxide was decanted from the polymer, and the polymer was washed 3 times with a total of 500 ml. of water. The polymer was dissolved in dichloromethane, the solution was washed twice with an excess of water to remove any dimethyl sulfoxide remaining, and the dichloromethane was stripped from the polymer. The polymer was then dissolved in about two times its volume of benzene, decanted, and the benzene was stripped from the purified polymer. A yield of 293 g. of polymer was obtained having a Brookfield viscosity of 122,000 cps. (No. 7 spindle, 20 r.p.m. at 23° C.). Mercaptan sulfur was 5.38 percent and the molecular weight was 1012 as determined by osmotic methods. Cure was effected by mixing, at room temperature, 150 g. of polymer and 66 g. of a mixture comprised of 50 weight percent lead dioxide and 50 weight percent of dibutyl phthalate. This was designated as Run 1.

To a second stirred reactor were charged 2.0 moles (352 g.) of a mixture of 3-(2-mercaptoethyl)cyclohexanethiol and 4-(2-mercaptoethyl)cyclohexanethiol, 0.03 mole (4.2 g.) of 1,2,3-propanetrithiol, and 650 ml. of dimethyl sulfoxide. Reaction was effected and polymer was recovered as in Run 1. A yield of 302 g. of polymer was obtained having a Brookfield viscosity of 404,000 cps. (No. 7 spindle, 5 r.p.m. at 23.5° C.). Mercaptan sulfur was 7.15 percent, and the molecular weight was 900 as determined by osmotic methods. One portion (35 g.) of this polymer was cured by mixing with such, at room temperature, 20.5 g. of a mixture comprised of 50 weight percent lead dioxide and 50 weight percent dibutyl phthalate and also 0.12 g. of cobalt linoresinate. This material was designated Run 2, Sample A. A second portion was cured in like manner but in the absence of the cobalt linoresinate. This was designated Run 2, Sample B.

As cure of each polymer was effected, observations were made and tests for tensile strength, elongation, and low temperature flexibility were made. Results of such tests and observations are summarized in the following table.

TABLE I

|  | Ether-containing polymer of Run 1 | Non-ether-containing polymer of Run 2 | |
|---|---|---|---|
|  |  | Sample A | Sample B |
| Time from start of cure until tack-free to touch. | 24 hours | 5 days | Tacky after 14 days. |
| Tensile Strength, p.s.i.:[1] |  |  |  |
| After 1 day | 132 | Too tacky | Too tacky. |
| After 2 days | _ | 41 | Do. |
| After 7 days | 151 | 253 | Do. |
| After 14 days | 130 | 364 | 124. |
| Elongation, percent:[1] |  |  |  |
| After 1 day | 280 | Too tacky | Too tacky. |
| After 2 days | _ | 600 | Do. |
| After 7 days | 550 | 200 | Do. |
| After 14 days | 500 | 187 | 250. |
| Flexibility at −23° C [2] | Flexible | Broke | Broke. |
| Gehman freezing point, ° C [3] | −26 | Broke [4] | Too tacky. |

[1] ASTM D412-62T.
[2] Samples cooled to −23° C. in a cold box 24 hours and then flexed by hand.
[3] ASTM D1053-58T.
[4] Similar material from another run exhibited a value of −13° C.

The above data demonstrate that the polymers of this invention, polymers containing ether linkages (Run 1), become tack-free, develop their tensile strength more rapidly, and are more flexible than 3- and 4-(2-mercaptoethyl) cyclohexanethiol-based polymers (Run 2) of the prior art. The elongation of the polymers of this invention (Run 1) increases rapidly with cure and then remains constant, a desirable result. Polymers of the prior art, on the other hand, exhibit high values initially, but soon lose such desirable properties as can be seen in Run 2.

Example II

A mixture of 3- and 4-(2-mercaptoethyl)cyclohexanethiol (316.8 g., 1.8 moles), 1,10-decanedithiol (41.2 g., 0.2 mole), 1,2,3,-propanetrithriol (4.2 g., 0.03 mole), and dimethyl sulfoxide (650 ml.) were combined in a resin vessel and heat was applied. After 50 minutes at 145° C. the polymer precipitated and the heating was discontinued. The precipitated polymer was decanted, washed with three 500-ml. portions of water and then was dissolved in dichloromethane. After washing the solution with two 500-ml. portions of water, the dichloromethane solution was dried over sodium sulfate and then concentrated to give 307 g. (87 percent) yield of product. The material had a viscosity of 15,200 cps., a molecular weight of 767, and a mercaptan sulfur content of 8.64 percent. A portion (120 g.) of the polymer was mixed with 86 g. of lead dioxide dispersed in dibutyl phthalate (50 parts PbO₂, 50 parts dibutyl phthalate, by weight). The cured composition had the following properties:

Tensile strength [1] _____ p.s.i.__ 221
Elongation [1] _____ percent__ 60
Hardness, Shore A-2 [2] _____ 66
Lupke rebound value [3] _____ 56
Flexible at _____ °C__ −21

[1] ASTM D412–62T.
[2] ASTM D676–59T.
[3] G. G. Winspear, Ed., "The Vanderbilt Rubber Handbook," R. T. Vanderbilt Publishing Company, New York (1958), p. 220.

Example III

A mixture of 3- and 4-(2-mercaptoethyl)cyclohexanethiol (316.8 g., 1.8 moles), bis(3-mercaptopropionate) of triethylene glycol (65.3 g., 0.2 mole) and 1,2,3-propanetrithiol (4.2 g., 0.03 mole) in 650 ml. dimethyl sulfoxide was heated at 150–155° C. until the product precipitated (approximately 40 min.). The precipitated polymer product was collected in the same manner as described in Example II. A yield of 324 g. (86 percent) of polymer having a viscosity of 64,480 cps., a molecular weight of 1255, and a mercaptan sulfur content of 4.75 percent was obtained. A 75-g. portion of the polymer was cured at about 25° C. with 29.4 g. of a 1:1 dispersion of lead dioxide and hydrogenated terphenyl oil (HB–40) for 16 days. The resulting cured elastomeric material had the following properties; determined as in Example II:

Tensile strength _____ p.s.i.__ 267
Elongation _____ percent__ 400
Hardness, Shore A-2 _____ 48
Lupke rebound value _____ 32
Flexible at _____ °C__ −21

Example IV

A mixture of 3- and 4-(2-mercapto ethyl)cyclohexanethiol (316.08 g., 1.8 moles), bis(2-mercaptoethyl) sulfide (30.8 g., 0.2 mole) and 1,2,3-propanetrithiol (4.2 g., 0.03 mole) in 650 ml. of dimethyl sulfoxide were heated at 160° C. until the polymer precipitated (approx. 40 min.). The precipitated polymer was recovered in the same manner as described in Example II. A yield of 320 g. (94 percent) of polymer having a viscosity of 184,000 cps., a molecular weight of 945, a mercaptan sulfur content of 4.73 percent, and a total sulfur content of 35 percent was obtained. The polymer (150 g.) was cured with 57.7 g. of a dispersion of lead dioxide in dibutyl phthalate (same as in Example II) for 20 days at a temperature of about 25° C. The cured product had the following properties, determined as in Example II:

Tensile strength _____ p.s.i.__ 129
Elongation _____ percent__ 430
Hardness, Shore A-2 _____ 47
Lupke rebound value _____ 34
Flexible at _____ °C__ −21

Example V

A mixture of 264 g. of 3- and 4-(2-mercaptoethyl)cyclohexanethiol (1.5 moles), 69 g. of bis(2-mercaptoethyl) ether (0.5 mole) and 7.2 g. of 1,5,10-dicanetrithiol (0.03 mole) was heated for 35 minutes at a temperature of 150° C. in 650 ml. of dimethyl sulfoxide. The precipitated polymer product was thereafter recovered in the same manner as described in Example II. A yield of 267 g. (80 percent) of polymer was obtained. The polymer product had a viscosity of 50,000 cps., a molecular weight of 880, and a mercaptan sulfur content of 6.5 percent. A 70-g. portion of the recovered polymer was cured for 14 days at a temperature of about 25° C. with 37.3 g. of a dispersion of lead dioxide in dibutyl phthalate (same as in Example II). The cured compositoin had the following properties; determined as in Example II:

Tensile strength _____ p.s.i.__ 195
Elongation _____ percent__ 205
Hardness, Shore A-2 _____ 53
Lupke rebound value _____ 40
Flexible at _____ °C__ −21

Example VI

A terpolymer was prepared from a mixture of 3- and 4-(2-mercaptoethyl)cyclohexanethiol (724.7 g., 4.11 moles), bis(2-mercaptoethyl) ether (190 g., 1.37 moles), and 1,2,3-propanetrithiol (11.53 g., 0.082 mole) in 650 ml. of dimethyl sulfoxide as described in Example II. A 40-g. portion of the polymer was mixed with 40 g. of a liquid mercapto-terminated copolymer of butadiene and acrylonitrile (Hycar MTBN), followed by the addition of 31.7 g. of a dispersion of lead dioxide in dibutyl phthalate (same as in Example II). The resulting composition was thereafter cured for 8 days at a temperature of about 25° C. The cured composition had the following properties, determined as in Example II:

Tensile strength _____ p.s.i.__ 143
Elongation _____ percent__ 850
Hardness, Shore A-2 _____ 32
Lupke rebound value _____ 49
Flexible at _____ °C__ −28

A portion of each of the polymers making up the above blend was cured separately. The properties of these cured materials were as follows:

| | Terpolymer | Mercaptan-terminated copolymer |
|---|---|---|
| Tensile strength, p.s.i. | 182 | 77 |
| Elongation, percent | 490 | 260 |
| Hardness, Shore A-2 | 53 | 22 |
| Lupke rebound value | 40 | 50 |
| Flexibility at −26° C | Brittle | Flexible |

A comparison of the above data with that obtained for the cured blend clearly demonstrates that there is obtained a useful cured blend composition having a totally unexpected elongation value (850%) when compared with that of the individual components, upon curing, of the blend (260 and 490%).

Reasonable variations and modifications of this invention can be made or followed, in view of the foregoing, without departing from the spirit or scope thereof.

I claim:
1. A process for producing mercaptan polymers which comprises oxidatively coupling a mixture of:
   (a) a mercaptoalkylcycloalkanethiol having the formula HS—Y—Z—SH wherein Y is a cycloalkylene radical containing 5 to 8 carbon atoms, Z is an alkylene moiety containing 1 to 5 carbon atoms;
   (b) a dimercapto-terminated compound having the formula

HS—R'—(XR'')ₙ—SH wherein R' is an unsubstituted or cycloalkyl- or aryl-substituted alkylene radical containing 1 to 36 carbon atoms, R'' is an unsubstituted or cycloalkyl- or aryl-substituted alkylene radical containing 1 to 10 carbon atoms, X is

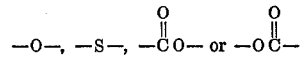

and n is an integer from 0 to 4;
   (c) a polythiol of the formula R(SH)ₘ wherein R is a hydrocarbyl radical selected from the group consisting of saturated aliphatic, saturated cycloaliphatic, and aromatic radicals, and combinations thereof having a valence equal to m and containing 3 to 20 carbon atoms and m is an integer from 3 to 6 by treating said mixture with an oxidizing agent so as to form polymers thereof containing disulfide linkages and thereafter curing the resulting polymers by treating with a curing agent.

2. A process according to claim 1 wherein said oxidizing agent is selected from the group consisting of dimethyl sulfoxide, oxygen, hydrogen peroxide, sodium peroxide and calcium peroxide and said curing agent is selected from the group consisting of lead dioxide, zinc oxide, cumene hydroperoxide, dinitrobenzene and p-quinone dioxime.

3. A process according to claim 1 wherein the oxidative coupling reaction is carried out at a temperature in the range of 5° C. to 300° C. for 0.1 to 24 hours.

4. A process according to claim 1 wherein (a) is a mixture of 3- and 4-(2-mercaptoethyl)cyclohexanethiol, (b) is bis(2-mercaptoethyl) ether and (c) is 1,2,3-propanetrithiol.

5. A process according to claim 1 wherein (a) is a mixture of 3- and 4-(2-mercaptoethyl)cyclohexanethiol, (b) is 1,10-decanedithiol and (c) is 1,2,3-propanetrithiol.

6. A process according to claim 1 wherein (a) is a mixture of 3- and 4-(2-mercaptoethyl)cyclohexanethiol, (b) is bis(3-mercaptopropionate) of triethylene glycol and (c) is 1,2,3-propanetrithiol.

7. A process according to claim 1 wherein (a) is a mixture of 3- and 4-(2-mercaptoethyl)cyclohexanethiol, (b) is bis(2-mercaptoethyl) sulfide and (c) is 1,2,3-propanetrithiol.

8. A process according to claim 1 wherein (a) is a mixture of 3- and 4-(2-mercaptoethyl)cyclohexanethiol, (b) is bis(2-mercaptoethyl) ether and (c) is 1,5,10-decanetrithiol.

9. A process according to claim 1 wherein (a) is a mixture of 3- and 4-(2-mercaptoethyl)cyclohexanethiol, (b) is bis(2-mercaptoethyl) ether and (c) is 1,2,3-propanetrithiol.

10. The product of the process of claim 1.
11. The product of the process of claim 4.
12. The product of the process of claim 5.
13. The product of the process of claim 6.
14. The product of the process of claim 7.
15. The product of the process of claim 8.
16. The product of the process of claim 9.

17. As a novel composition the cured blend comprising an uncured product of the process of claim 1 and a mercapto-terminated polymer of a 1,3-alkadiene.

References Cited

UNITED STATES PATENTS 3,450,790    6/1969    Simpson            260—823

DONALD E. CZAJA, Primary Examiner

M. I. MARQUIS, Assistant Examiner

U.S. Cl. X.R.

260—23, 27, 79, 823